US008805809B2

(12) United States Patent
Laxmanan et al.

(10) Patent No.: US 8,805,809 B2
(45) Date of Patent: Aug. 12, 2014

(54) AUTOTRANSFORM SYSTEM

(75) Inventors: Kasilingam B. Laxmanan, Newark, DE (US); Yudong Chen, Wilmington, DE (US); Julea K. Duke, Charlotte, NC (US); Ming Xue, Malvern, PA (US)

(73) Assignee: Bank of America Corporation, Charlotte, NC (US)

( * ) Notice: Subject to any disclaimer, the term of this patent is extended or adjusted under 35 U.S.C. 154(b) by 87 days.

(21) Appl. No.: 13/595,321

(22) Filed: Aug. 27, 2012

(65) Prior Publication Data

US 2014/0059047 A1 Feb. 27, 2014

(51) Int. Cl.
*G06F 17/30* (2006.01)

(52) U.S. Cl.
USPC .......................................................... 707/700

(58) Field of Classification Search
CPC ..................... G06F 17/30994; G06F 17/30943
See application file for complete search history.

(56) References Cited

U.S. PATENT DOCUMENTS

| | | | | |
|---|---|---|---|---|
| 7,062,447 | B1 * | 6/2006 | Valentine et al. | 705/1.1 |
| 7,818,655 | B1 * | 10/2010 | Lee et al. | 714/799 |
| 2006/0100844 | A1 * | 5/2006 | Yang et al. | 703/21 |
| 2010/0082469 | A1 * | 4/2010 | Oliveira et al. | 705/35 |

* cited by examiner

*Primary Examiner* — Khanh Pham
(74) *Attorney, Agent, or Firm* — Michael A. Springs

(57) ABSTRACT

According to one embodiment, an apparatus stores a plurality of datapoints. A datapoint comprises a first value and a second value that depends upon the value of the first value. The apparatus associates the datapoint with a group from a plurality of groups. The group is associated with an identifying range and the datapoint is associated with the group based at least in part upon the first value of the datapoint and the identifying range of the group. The apparatus calculates a median of the second values of the datapoints associated with the group and a performance value by performing a regression based at least in part upon the identifying range and the calculated median of the group. The apparatus determines that the performance value exceeds a baseline value and in response, presents, on a display, an illustration depicting the identifying range and the associated median of the group.

17 Claims, 4 Drawing Sheets

AUTOTRANSFORM SYSTEM

TECHNICAL FIELD

This disclosure relates generally to a system for electronically communicating transformed information.

BACKGROUND

As the amount of data storage has grown, so has the demand for quick and robust analysis and communication of that data. However, analyzing and communicating that data becomes more difficult and tedious as the amount of data grows.

SUMMARY OF THE DISCLOSURE

According to one embodiment, an apparatus stores a plurality of datapoints. A datapoint comprises a first value and a second value that depends upon the value of the first value. The apparatus associates the datapoint with a group from a plurality of groups. The group is associated with an identifying range and the datapoint is associated with the group based at least in part upon the first value of the datapoint and the identifying range of the group. The apparatus calculates a median of the second values of the datapoints associated with the group and a performance value by performing a regression based at least in part upon the identifying range and the calculated median of the group. The apparatus determines that the performance value exceeds a baseline value and in response, presents, on a display, an illustration depicting the identifying range and the associated median of the group.

Certain embodiments may provide one or more technical advantages. A technical advantage of one embodiment includes faster and more accurate data modeling. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
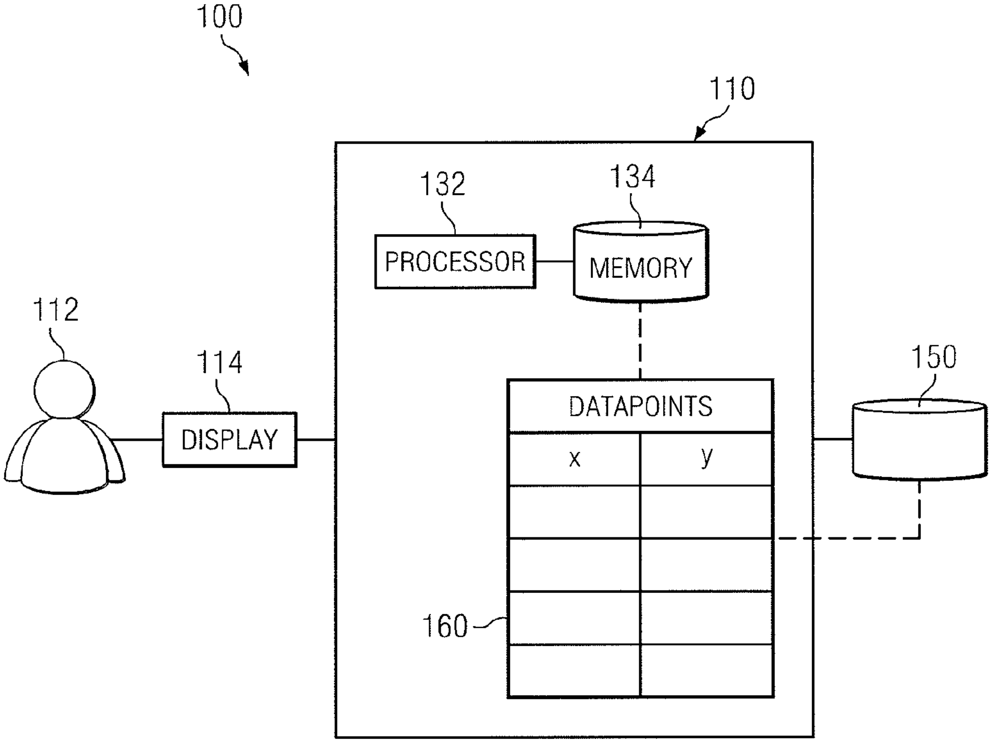
FIG. 1 illustrates a system for performing autotransformation.

FIG. 1 illustrates a system 100 for performing auto transformation. System 100 may include a display 114, a server 110, and an external database 150. Display 114 may be communicatively coupled to device 110. Device 110 may be communicatively coupled to external database 150.

In particular embodiments, device 110 may present on display 114 information and data to user 112. For example, server 110 may present a chart on display 114 to user 112. Display 114 may be a monitor, a projector, a screen, or any other apparatus capable of displaying information and data to user 112. For example, display 114 may be a touchscreen, a liquid crystal display, or a television.

System 100 may include device 110 that analyzes datapoints 160. Device 110 may include a memory 134 and a processor 132 communicatively coupled to memory 134. Processor 132 and memory 134 may perform the functions described herein. Device 110 may be a personal computer, a workstation, a laptop, a wireless or cellular telephone, an electronic notebook, a personal digital assistant, a tablet, a server, or any other device (wireless, wireline, or otherwise) capable of receiving, processing, storing, and/or communicating information with other components of system 100. Device 110 may also include a user interface, such as a display, a touchscreen, a microphone, keypad, or other appropriate terminal equipment usable by user 112.

A datapoint 160 may include observed values of particular variables. In the example illustrated in FIG. 1, datapoints 160 include observed values for two variables represented as X and Y. Although this disclosure describes datapoints 160 including a particular number of observed values, this disclosure contemplates datapoints 160 including any suitable number of observed values. In particular embodiments, an observed value of a datapoint may depend on another observed value, that is one of the observed values may be expressed as a function of another observed value. In the example illustrated in FIG. 1, if Y depended on X, then Y may be expressed as f(X) where f(X) is some function of X. In particular embodiments, device 110 may be configured to approximate a linear relationship between X and Y, that is, device 110 may be configured to approximate a linear f(X). A linear f(X) may be expressed in the form f(X)=a+bX where a and b are real numbers.

In particular embodiments, device 110 may store and analyze datapoints 160 and determine a linear f(X) that best fits the datapoints 160. Generally, device 110 may make this determination by grouping particular datapoints 160 into groups and then evaluating the groups of datapoints 160. Device 110 may adjust the number and size of the groups in order to determine the best fit linear f(X). After determining the best fit linear f(X), device 110 may present on display 114, the groups of datapoints 160 that produced the best fit linear f(X). In particular embodiments, external database 150 may store datapoints 160. Device 110 may retrieve datapoints 160 from external database 150.

In operation, device 110 may transform datapoints 160 according to a binning algorithm to produce a number of models for datapoints 160. The binning algorithm used by device 110 to transform datapoints 160 will be discussed further with respect to FIG. 2. After device 110 generates the various models for datapoints 160, device 110 may evaluate those models to determine which model best represents datapoints 160. For example, user 112 may desire to discover a linear relationship between the observed X and Y values of datapoints 160. Device 110 may evaluate the various models of datapoints 160 to see which model shows the most linear relationship between the observed X and Y values of datapoints 160. Device 110 may then present on display 114 the model that shows the most linear relationship between the observed X and Y values of datapoints 160. In this manner, user 112 can visualize the linear relationship between the observed X and Y values.

Figure 2:
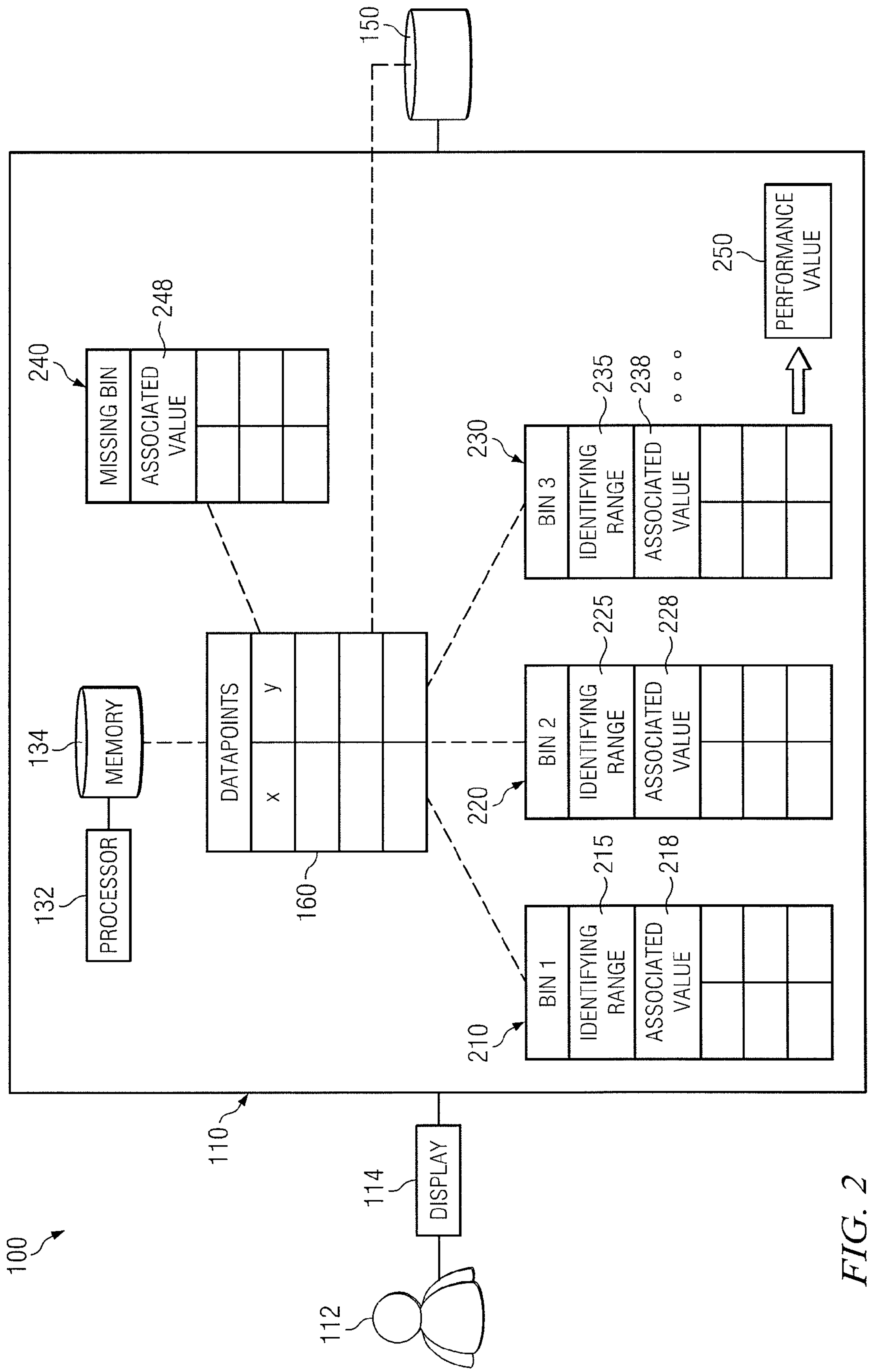
FIG. 2 illustrates the system of FIG. 1 performing autotransformation according to a binning algorithm.

FIG. 2 illustrates the system 100 of FIG. 1 performing autotransformation according to a binning algorithm. In general, device 110 may group particular datapoints 160 into an appropriate number of bins. For example, device 110 may group particular datapoints into a first bin 210, a second bin 220, and a third bin 230. Each bin may be associated with an identifying range and a value. For example, first bin 210 may be associated with a first identifying range 215 and a first associated value 218.

In particular embodiments, device 110 may select the identifying range of each bin. The identifying range determines how particular datapoints 160 are grouped. As an example and not by way of limitation, device 110 may group ten datapoints 160 with X values ranging from one to ten. Device 110 may determine to group the ten datapoints 160 into three bins. The first bin 210 may have an identifying range 215 of all X values less than or equal to four. The second bin 220 may have an identifying range 225 of X values from five to eight, and the third bin 230 may have an identifying range 235 of all X values greater than or equal to nine. Device 110 may then group the ten datapoints 160 into one of the three bins based on the X value of the datapoint 160 and the identifying range of the bin. For example, if one datapoint 160 had an X value of five, that datapoint 160 would be grouped into the second bin 220 because the identifying range 225 of the second bin 220 includes values of five to eight.

By using bins that have identifying ranges that are open at the boundaries, device 110 easily handles datapoints that are outliers. For example, even if a datapoint 160 had an X value that was far greater than the X values of the other datapoints 160, device 110 would group the datapoint 160 into the third bin 230 because the identifying range 235 of that bin is open (greater than or equal to nine). In this manner, device 110 may avoid creating bins that contain only a few outlier datapoints 160.

After grouping the datapoints 160 into their respective bins, device 110 may calculate a value associated with each bin. In particular embodiments, device 110 may calculate a median value of the Y values of the datapoints 160 that are grouped into a bin. For example, if the first bin 210 contains two datapoints 160 with Y values of ten and twenty, respectively, then device 110 may calculate the median value to be fifteen. As another example, and not by way of limitation, device 110 may calculate an associated value by performing a linear interpolation based on the datapoints 160 grouped in a particular bin. For example, device 110 may determine a linear function that best approximates the datapoints 160 grouped into a particular bin and then determine the output of the linear function if the median of the X values of the datapoints 160 grouped in the bin was input into the linear function. Device 110 may then associate the output of the linear function with the bin. Although this disclosure describes device 110 calculating an associated value in a particular manner, this disclosure contemplates device 110 calculating the associated value in any suitable manner.

In particular embodiments, device 110 may perform a transformation on datapoints 160 prior to grouping the datapoints 160 into bins. For example, device 110 may perform a mathematical operation, such as a logarithm, on the Y values of datapoints 160 prior to grouping. In this manner, device 110 may transform datapoints 160 prior to grouping them in order to determine the best linear relationship between the X and Y values of datapoints 160. Although this disclosure describes device 110 performing a particular type of transformation on datapoints 160 prior to grouping, this disclosure contemplates device 110 performing any appropriate type of transformation on datapoints 160 prior to grouping. Although this disclosure describes device 110 performing transformations on datapoints 160 prior to grouping, this disclosure contemplates device 110 performing transformations on datapoints 160 during and after grouping.

Device 110 may generate several models of datapoints 160 by adjusting the number of bins used in the binning algorithm and the identifying ranges of those bins. Device 110 may perform these adjustments based on the maximum number of datapoints 160 grouped into any particular bin. For example, if a particular bin contains many more datapoints 160 than the other bins, device 110 may determine that the identifying range of the particular bin can be divided amongst several bins in order to improve the distribution of datapoints 160. In particular embodiments, device 110 may perform these adjustments based on the number of datapoints 160. For example, device 110 may adjust the number of bins so that the average number of datapoints 160 per bin is a particular value. In particular embodiments, device 110 may perform these adjustments based on a predetermined maximum number of datapoints 160 assigned to a group. For example, it may be predetermined by user 112 that a bin can contain no more than ten datapoints 160. Device 110 may adjust the number of bins and the identifying ranges in order to satisfy that condition. Device 110 may perform several iterations of the binning algorithm using different numbers of bins with different identifying ranges to generate several models that can be compared to one another. Although this disclosure describes device 110 adjusting the number of bins and the identifying ranges based on particular factors, this disclosure contemplates device 110 adjusting the number of bins and the identifying ranges based on any appropriate factors.

As an example and not by way of limitation, datapoints 160 may represent account balances versus annual salaries. If datapoints 160 were plotted on a chart, one would expect the chart to illustrate various clusters of datapoints 160. However, a linear relationship may not be easily visualized by looking at the datapoints 160. Device 110 may group these datapoints 160 using the binning algorithm to quickly determine a relationship between account balances and annual salaries. Device 110 may associate each bin with an identifying range of annual salaries. Then device 110 may group the datapoints 160 into the bins based on annual salaries. If a cluster of datapoints 160 is concentrated around a particular annual salary, these datapoints 160 should be grouped into the same bin. Device 110 may then calculate a median account balance for each bin. Although this disclosure describes device 110 grouping particular types of data, such as account balances and annual salaries, this disclosure contemplates device 110 grouping any appropriate type of data, such as for example, payment histories, dates, deposits, and transactions.

In particular embodiments, device 110 may further utilize a missing bin 240 to handle missing values. Device 110 may group into missing bin 240, datapoints 160 that have missing or null X values. Device 110 may calculate an associated value 248 for missing bin 240. For example, device 110 may calculate the median value of the Y values grouped into missing bin 240 and use the calculated median as the associated value 248. In particular embodiments, device 110 may further calculate an X value for missing bin 240. For example, device 110 may calculate a median value of the X values for the datapoints 160 that have been grouped in bins other than missing bin 240. Device 110 may then associate the calculated median with missing bin 240. In this manner, device 110 may consider datapoints 160 with missing X values in generating the model rather than discarding these datapoints 160.

In particular embodiments, device 110 may evaluate whether grouping the datapoints 160 into a particular number of bins with particular identifying ranges produces a suitable model of the datapoints 160. Device 110 may perform a regression based on the identifying ranges of the bins and the associated values of the bins to produce a performance value 250. For example, device 110 may perform a regression based on the identifying ranges and associated values of the first bin 210, second bin 220, and third bin 230 to produce an R-squared value or the coefficient of determination. Device 110 may then compare performance value 250 with the performance values of other models of datapoints 160. For example, device 110 may group datapoints 160 into a different number of bins with different identifying ranges and determine a performance value 250 associated with that grouping. Device 110 may then compare the two performance values 250 to determine which grouping is more suitable for datapoints 160. As an example and not by way of limitation, device 110 may determine that the grouping with the greater R-squared value is the more suitable model for datapoints 160.

In particular embodiments, device 110 may compare a performance value 250 against a baseline value. For example, the baseline value may be produced as a result of performing a regression based on the X and Y values of datapoints 160. Device 110 may then compare the performance value 250 with the baseline value to determine whether the grouping of datapoints 160 produces a suitable model of datapoints 160. For example, if the baseline value is higher than the performance value 250, device 110 may determine that the grouping of datapoints 160 is not suitable because grouping the datapoints 160 produced a worse model of the datapoints 160 than not grouping the datapoints 160 at all.

To continue the previous example, device 110 may evaluate the binning on account balances versus annual salaries. Device 110 may perform a regression based on the identifying ranges and the medians of each bin to produce an R-squared value. Device 110 may then compare this R-squared value with a baseline value to determine if the performed binning generated an appropriate model of account balances versus annual salaries. To generate the baseline value, device 110 may perform a regression on the datapoints 160 to produce a baseline R-squared value.

In particular embodiments, device 110 may present on display 114 datapoints 160 as well as the model of datapoints 160 produced by grouping datapoints 160 into bins. Device 110 may further present on display 114 the performance value 250 and/or the baseline value. In particular embodiments, device 110 may display datapoints 160 but not the model of datapoints 160 if device 110 determines that the model is not suitable for datapoints 160. For example, device 110 may determine that a performance value 250 associated with the model is less than a performance value 250 associated with not grouping the datapoints 160. In that instance, device 110 may exclude the model from the display 114. An example output presented on display 114 is discussed further with respect to FIG. 4.

In particular embodiments, device 110 may generate a new datapoint according to the model that best shows the linear relationship between the X and Y values of the datapoints 160. The new datapoint 160 may be used to help determine or approximate the value of Y given a particular value of X. In this manner, user 112 may use the model to predict the behavior of Y. For example, device 110 may use ten datapoints 160 to generate a model. The model may use the identifying ranges and the calculated medians of the binning algorithm. However, the ten datapoints 160 may not represent all possible values of X. In this example, user 112 may use the generated model to generate a new datapoint 160 that has an X value that was not a part of the original ten datapoints 160. In this manner, user 112 can use the model to predict what the Y value for such a new datapoint 160 would be.

Although this disclosure describes datapoints 160 comprising numeric values, this disclosure contemplates datapoints 160 comprising any suitable values including characters such as letters or symbols. In embodiments where datapoints 160 comprise characters, device 110 may still group those datapoints 160 into bins by first transforming character values into numeric values. Device 110 may then group these datapoints 160 into appropriate bins and determine a performance value 250. Device 110 may perform several iterations of this binning algorithm by adjusting the number values into which the character values are transformed, the number of bins, and the identifying ranges of the bins. Device 110 may then compare the performance value 250 with other performance values 250 or with a baseline value to determine whether the transformation of the character values and the grouping of the datapoints 160 into bins yields a suitable model for datapoints 160.

Figure 3:
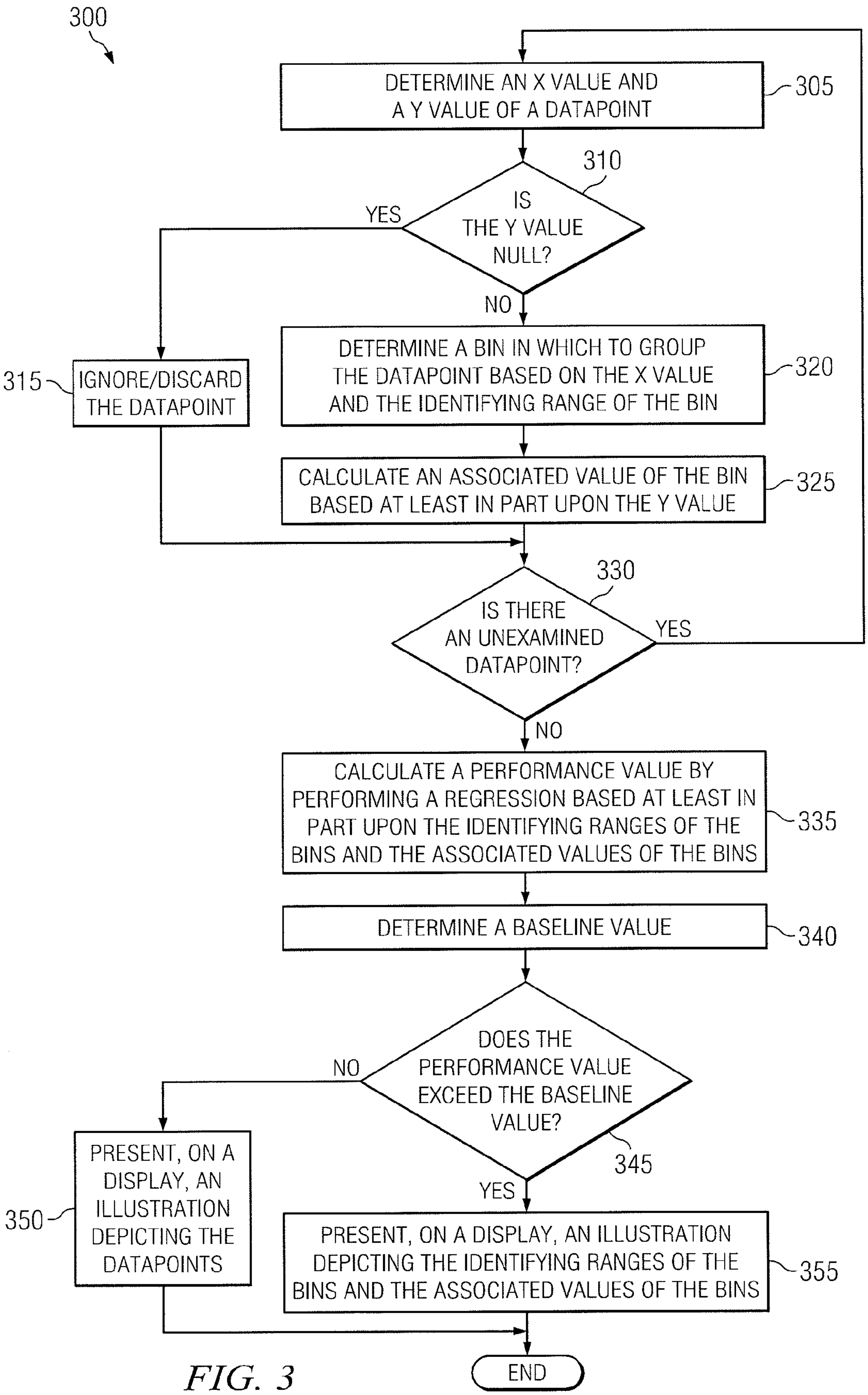
FIG. 3 is a flowchart illustrating a method of performing autotransformation.

FIG. 3 is a flowchart illustrating a method 300 of performing autotransformation. Device 110 may perform method 300. Device 110 may begin by determining an X value and a Y value of a datapoint 160 in step 305. In step 310, device 110 may determine if the Y value is null. If the Y value is null, device 110 may ignore or discard the datapoint in step 315 and continue to step 330. If the Y value is not null, then device 110 may determine a bin in which to group the datapoint 160 based on the X value and the identifying range of the bin in step 320. In step 325, device 110 may calculate an associated value of the bin based at least in part upon the Y value. In particular embodiments, the associated value may be the median value of the Y values of the datapoints 160 grouped in the bin.

In step 330, device 110 may determine if there is an unexamined datapoint 160. If there is an unexamined datapoint 160, device 110 may continue to step 305 to examine the unexamined datapoint 160. If there are no unexamined datapoints 160, device 110 may continue to step 335 to calculate a performance value 250 by performing a regression based at least in part upon the identifying ranges of the bins and the associated values of the bins. In particular embodiments, the performance value is an R-squared value of the regression. In step 340, device 110 may determine a baseline value. In particular embodiments, the baseline value may be calculated by performing a regression on the X and Y values of the datapoints 160. In other embodiments, the baseline value may be calculated by performing a regression on a different grouping of datapoints 160. For example, datapoints 160 may be grouped into a different number of bins with different identifying ranges.

In step 345, device 110 may determine whether the performance value 250 exceeds the baseline value. If the performance value 250 does not exceed the baseline value, device 110 may present on a display 114 an illustration depicting the datapoints 160 in step 350. If the performance value 250 does exceed the baseline value, device 110 may conclude in step 355 by presenting on a display 114 an illustration depicting the identifying ranges of the bins and the associated values of the bins.

Figure 4:
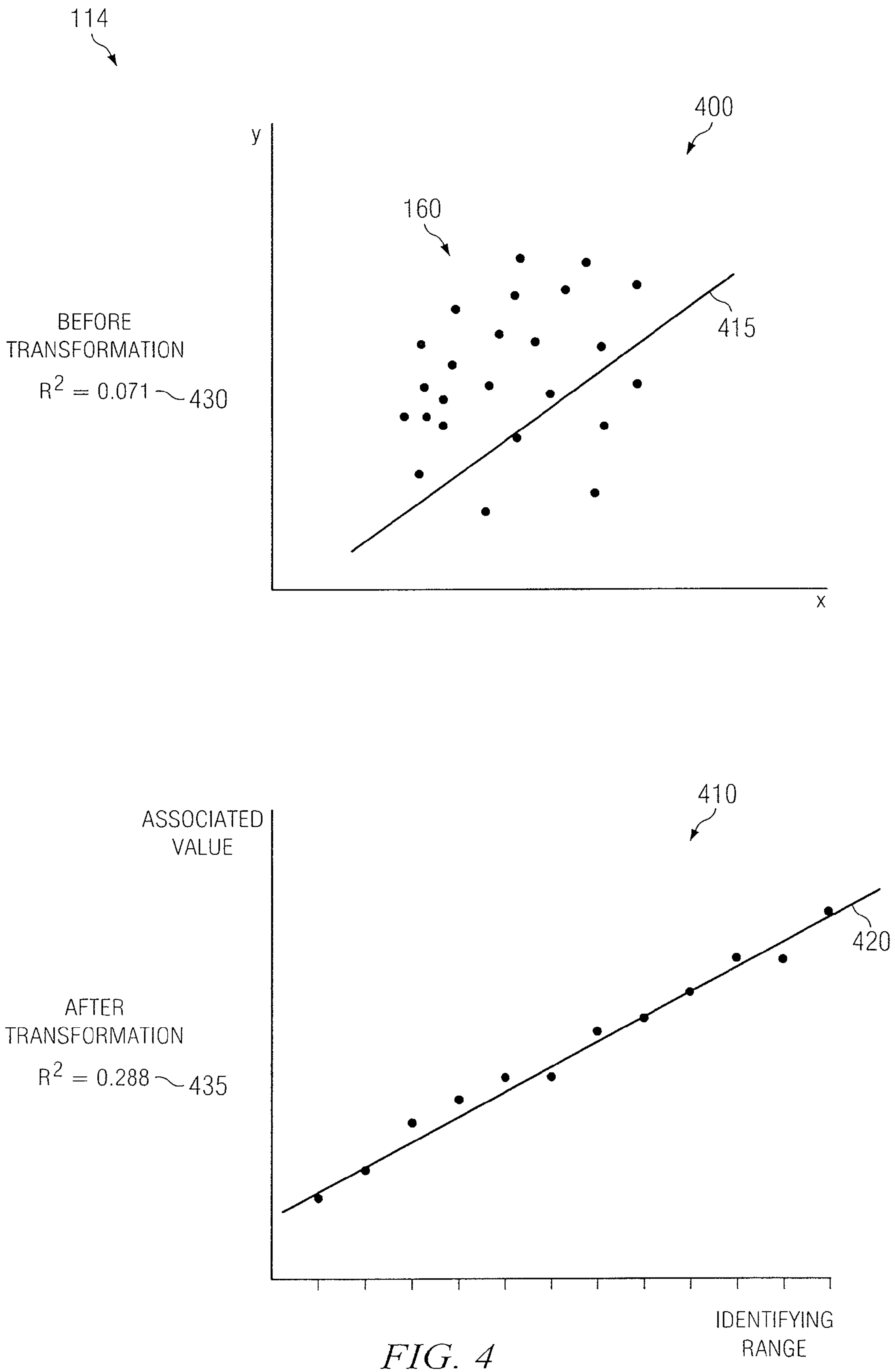
FIG. 4 illustrates a sample output of autotransformation.

FIG. 4 illustrates a sample output of autotransformation. In particular embodiments, device 110 may present the sample output on display 114. Device 110 may present a first chart 400 and a second chart 410 on display 114.

The first chart 400 may illustrate the datapoints 160. The horizontal axis of the first chart 400 illustrates the X values of datapoints 160 and the vertical axis of the first chart 400 illustrates the Y values of the datapoints 160. By using chart 400, device 100 may plot the datapoints 160. Device 110 may further use chart 400 to display the results of a regression performed on the datapoints 160. For example, line 415 may be the best linear fit for datapoints 160. Device 110 may further display the R-squared value 430 associated with line 415. In the example illustrated in FIG. 4, it is difficult to see a linear relationship because the datapoints 160 are clustered. By grouping the datapoints using the binning algorithm, a linear relationship, a linear relationship can be better visualized.

In particular embodiments, device 114 may use chart 410 to display the results of grouping the datapoints 160 into bins. The horizontal axis of chart 410 illustrates the identifying ranges of the bins and the vertical axis of chart 410 illustrates the associated values of the bins. In the example illustrated in FIG. 4, datapoints 160 have been grouped into twelve bins, each bin having an identifying range and an associated value. Device 110 has plotted the identifying ranges and the associated values of the bins in chart 410. By grouping datapoints 160 into bins, a more linear relationship can be seen. Line 420 illustrates the linear fit for the associated values and identifying ranges of the bins. In particular embodiments, device 110 may determine line 420 by performing a linear regression on the identifying ranges and associated values of the bins. Device 110 may further present on display 114 the R-squared value 435 associated with the linear regression. As can be seen in the example illustrated in FIG. 4, the R-squared value 435 after grouping the datapoints 160 into bins, is greater than the R-squared value 430 associated with not grouping the datapoints 160. As a result, device 110 may determine based on these R-squared values that grouping the datapoints 160 into twelve bins produces a more suitable model of the datapoints 160 than not grouping the datapoints 160. In this example, the R-squared example 430 associated with not grouping the datapoints 160 can be seen as a baseline value and the R-squared value 435 associated with grouping the datapoints 160 into bins can be seen as a performance value 250. However, this disclosure contemplates device 110 using any grouping of datapoints 160 to generate the baseline value. For example, device 110 may group the datapoints 160 into five bins and use the R-squared value of that grouping as the baseline value.

As an example, chart 400 may plot account balances versus annual salaries. The x values may be the annual salaries and the y values may be the account balances. In chart 400, the datapoints 160 are scattered and no clear relationship can be seen. However, after device 110 groups datapoints 160 into bins according to annual salaries, a clearer relationship can be seen in chart 410. As expected, as annual salary increases, the account balance also increases. By performing the binning algorithm, device 110 can approximate a linear relationship between the X and Y values of datapoints 160. In this example, device 110 has approximated a linear relationship between account balances and annual salaries.

In particular embodiments, device 110 may provide an efficient way to transform information and to evaluate these transformations. In particular embodiments, the binning algorithm used to transform the information may provide an efficient way to handle missing values and boundary values. Certain embodiments may include none, some, or all of the above technical advantages. One or more other technical advantages may be readily apparent to one skilled in the art from the figures, descriptions, and claims included herein.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. An apparatus comprising:
- a memory operable to store a plurality of datapoints, wherein a datapoint comprises:
  - a first value; and
  - a second value that depends upon the value of the first value; and
- a processor communicatively coupled to the memory and operable to:
  - associate the datapoint with a first group from a first plurality of groups, wherein:
    - the first group is associated with a first identifying range; and
    - the datapoint is associated with the first group from the first plurality of groups based at least in part upon the first value of the datapoint and the first identifying range of the first group;
  - associate the datapoint with a second group from a second plurality of groups, wherein:
    - the second group is associated with a second identifying range; and
    - the datapoint is associated with the second group from the second plurality of groups based at least in part upon the first value of the datapoint and the second identifying range of the second group;
  - calculate a median of the second values of the datapoints associated with the first group;
  - perform a linear interpolation based at least in part upon the datapoint and the median to produce a linear function;
  - associate the linear function with the first group;
  - calculate a first performance value by performing a linear regression based at least in part upon the first identifying range and the associated linear function of the first group;
  - calculate a second performance value based at least in part upon the second identifying range;
  - select the first performance value based at least in part upon a comparison between the first performance value and the second performance value;
  - determine that the first performance value exceeds a baseline value, wherein the baseline value is produced by performing a regression on at least the first value and the second value of the datapoint; and
  - present, on a display, an illustration depicting the first identifying range of the first group and the associated median of the first group in response to the determination that the first performance value exceeds the baseline value.

2. The apparatus of claim 1, wherein the processor is further operable to:
- determine that the first performance value does not exceed the baseline value; and
- present, on the display, an illustration depicting the datapoint in response to the determination that the first performance value does not exceed the baseline value.

3. The apparatus of claim 1, wherein:
- the first plurality of groups comprises an exception group associated with datapoints that comprise a first value that is null; and
- the processor is further operable to:
  - calculate the median of the second values of the datapoints associated with the exception group; and
  - associate, with the exception group, the calculated median of the second values of the datapoints associated with the exception group.

4. The apparatus of claim 1, wherein:

the second value comprises a character; and the processor is further operable to transform the character into a numeric value prior to associating the datapoint with the first group.

5. The apparatus of claim 1, wherein the processor is further operable to determine the number of groups in the first plurality of groups based at least in part upon the number of datapoints in the plurality of datapoints and a predetermined maximum number of datapoints associated with the first group.

6. The apparatus of claim 1, wherein the processor is further operable to generate a new datapoint based at least in part upon the identifying ranges and the calculated medians of at least one group from the first plurality of groups.

7. The apparatus of claim 1, wherein the processor is further operable to discard datapoints that comprise a second value that is null.

8. The apparatus of claim 1, wherein the first performance value is the coefficient of determination associated with the regression.

9. A method comprising:

storing a plurality of datapoints, wherein a datapoint comprises:

a first value; and a second value that depends upon the value of the first value; and associating the datapoint with a first group from a first plurality of groups, wherein:

the first group is associated with a first identifying range; and the datapoint is associated with the first group from the first plurality of groups based at least in part upon the first value of the datapoint and the first identifying range of the first group;

associating the datapoint with a second group from a second plurality of groups, wherein:

the second group is associated with a second identifying range; and the datapoint is associated with the second group from the second plurality of groups based at least in part upon the first value of the datapoint and the second identifying range of the second group;

calculating a median of the second values of the datapoints associated with the first group;

performing a linear interpolation based at least in part upon the datapoint and the median to produce a linear function;

associating the linear function with the first group;

calculating a first performance value by performing a linear regression based at least in part upon the first identifying range and the associated linear function of the first group;

calculating a second performance value based at least in part upon the second identifying range;

selecting the first performance value based at least in part upon a comparison between the first performance value and the second performance value;

determining that the first performance value exceeds a baseline value, wherein the baseline value is produced by performing a regression on at least the first value and the second value of the datapoint; and presenting, on a display, an illustration depicting the first identifying range of the first group and the associated median of the first group in response to the determination that the first performance value exceeds the baseline value.

10. The method of claim 9, further comprising:

determining that the first performance value does not exceed the baseline value; and presenting, on the display, an illustration depicting the datapoint in response to the determination that the first performance value does not exceed the baseline value.

11. The method of claim 9, wherein:

the first plurality of groups comprises an exception group associated with datapoints that comprise a first value that is null; and the method further comprising:

calculating the median of the second values of the datapoints associated with the exception group; and associating, with the exception group, the calculated median of the second values of the datapoints associated with the exception group.

12. The method of claim 9, wherein:

the second value comprises a character; and the method further comprising transforming the character into a numeric value prior to associating the datapoint with the first group.

13. The method of claim 9, further comprising determining the number of groups in the first plurality of groups based at least in part upon the number of datapoints in the plurality of datapoints and a predetermined maximum number of datapoints associated with the first group.

14. The method of claim 9, further comprising generating a new datapoint based at least in part upon the identifying ranges and the calculated medians of at least one group from the first plurality of groups.

15. The method of claim 9, further comprising discarding datapoints that comprise a second value that is null.

16. The method of claim 9, wherein the first performance value is the coefficient of determination associated with the regression.

17. A method comprising:

storing a plurality of datapoints, wherein a datapoint comprises:

a first value; and a second value that depends upon the value of the first value; and associating the datapoint with a first group from a first plurality of groups, wherein:

the first group is associated with a first identifying range;

the datapoint is associated with the first group from the first plurality of groups based at least in part upon the first value of the datapoint and the first identifying range of the first group; and the first plurality of groups comprises an exception group associated with datapoints that comprise a first value that is null;

associating the datapoint with a second group from a second plurality of groups, wherein:

the second group is associated with a second identifying range; and the datapoint is associated with the second group from the second plurality of groups based at least in part upon the first value of the datapoint and the second identifying range of the second group;

calculating a median of the second values of the datapoints associated with the first group;

calculating the median of the second values of the datapoints associated with the exception group;

associating, with the exception group, the calculated median of the second values of the datapoints associated with the exception group;

performing a linear interpolation based at least in part upon the datapoint and the median to produce a linear function;

associating the linear function with the first group;

calculating a first performance value by performing a linear regression based at least in part upon the first identifying range and the associated linear function of the first group;

calculating a second performance value based at least in part upon the second identifying range;

selecting the first performance value based at least in part upon a comparison between the first performance value and the second performance value;

determining that the first performance value exceeds a baseline value, wherein the baseline value is produced by performing a regression on at least the first value and the second value of the datapoint;

presenting, on a display, an illustration depicting the first identifying range of the first group and the associated median of the first group in response to the determination that the first performance value exceeds the baseline value; and generating a new datapoint based at least in part upon the identifying ranges and the calculated medians of at least one group from the plurality of groups.

* * * * *